UNITED STATES PATENT OFFICE.

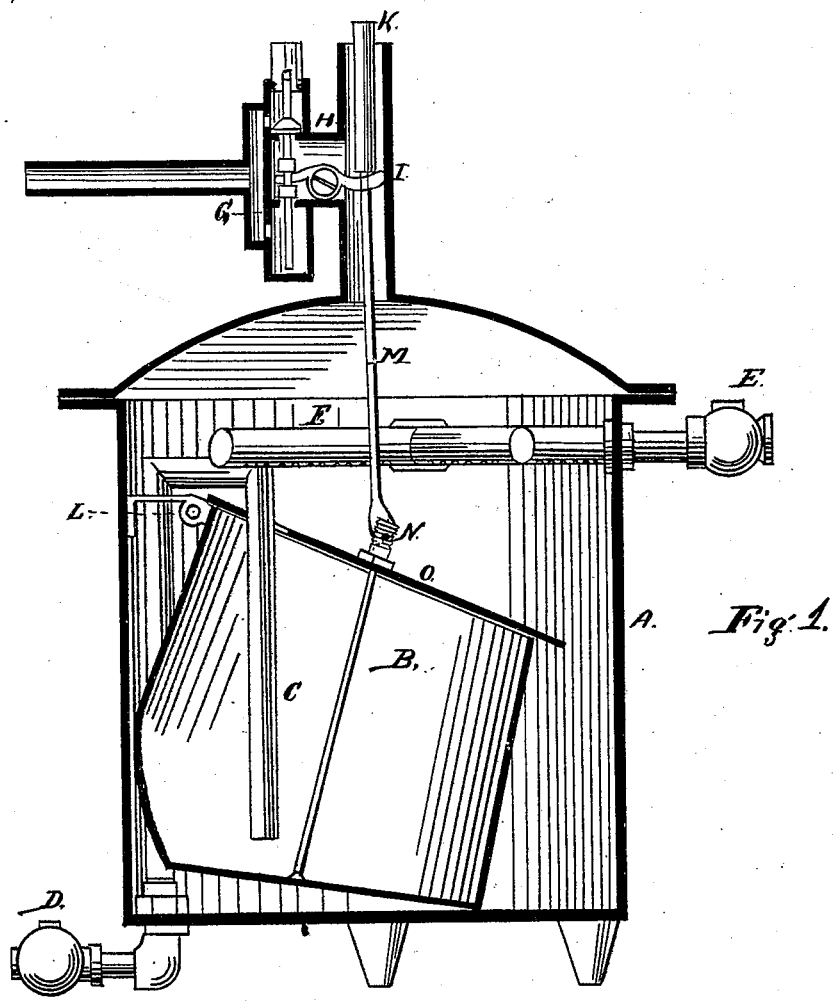

BARRENT W. FELTHOUSEN, OF MILWAUKEE, WISCONSIN.

IMPROVEMENT IN FEED-WATER APPARATUS.

Specification forming part of Letters Patent No. 171,605, dated December 28, 1875; application filed September 14, 1875.

*To all whom it may concern:*

Be it known that I, BARRENT W. FELT-HOUSEN, of Milwaukee, in the county of Milwaukee, in the State of Wisconsin, have invented certain Improvements in Steam-Traps, of which the following is a specification:

The object of my invention is to convey water to a steam-boiler, and is a trap by which as soon as water accumulates in it from the pipes which are used for heating by steam the steam is let on from the boiler, and the pressure of the same forces the water up into a siphon; and as soon the siphon is charged the water runs into the boiler, and a tilting apparatus which is used for the purpose rises and relieves the valve, and it closes and cuts off the steam, and the water continues to flow into the boiler till it is nearly all out of the tilting apparatus.

Figure 1 is a vertical section of my invention.

A is the outside of the trap; B, a tilter hung by the joint L; C, a siphon, which conveys the water to the boiler; D, a check-valve in the pipe which leads to the boiler; E, a check-valve in the pipe, through which the water is conveyed from the heating-pipes to the trap; F, a water-spreader to condense the steam in the trap after the water is conveyed out of same into the boiler; G, a valve which lets the steam into the trap; H, upper valve on the same rod with valve G, making it a poppet-valve; I, a trip-lever, one end of which is crotched and straddles the stem of valves G and H; and a stop on the stem above the end of trip-lever I catches on the end of the lever, and when the other end is pressed down opens the poppet-valve; K, a stop on rod M connected to the tilter B; L, a joint to which tilter B is attached, and on which it swings; M, rod attached to the tilter B, and connected to same by joint N; O, a cover above tilter B, to prevent the water from falling directly into same.

The operation is as follows: As the water flowing through valve E accumulates in trap A the side of tilter B opposite joint L rises, and the stop K on lever M is raised, and the valves G and H close; and when the water in trap A rises as high as the spreader F, as the side of the tilter can rise no higher, then the water will run over the top of tilter B and fill it, and its side will sink to the bottom of the trap, and stop K, striking on lever I, will bring its outer end down, and the other end rising strikes against the projection on the valve-rod, and opens the valve and lets the steam into the trap, and pressing on the water makes it flow out through siphon C and through valve D to the boiler; and as soon as the water is emptied enough, so that the side of tilter B shall rise enough, stop K will be raised off of lever I, and the valves G and H will close, and the steam will be shut off, and the water will continue to flow on through the siphon to the boiler till the tilter B is emptied. This tilter has a cover over its top, with an opening under the cover, where the water enters and fills it.

I claim as my invention—

1. Tilter B, water-spreader F, siphon C, rod M, stop K, lever I, and valves G and H, all in combination, substantially as specified.

2. Trap A, tilter B, siphon C, and water-spreader F, all in combination, substantially as specified.

BARRENT W. FELTHOUSEN.

Witnesses:
J. B. SMITH,
S. W. NATHAN.